US010695968B2

(12) United States Patent
Oono

(10) Patent No.: US 10,695,968 B2
(45) Date of Patent: Jun. 30, 2020

(54) CONTROLLER FOR INJECTION MOLDING MACHINE

(71) Applicant: FANUC CORPORATION, Yamanashi (JP)

(72) Inventor: Hajime Oono, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 56 days.

(21) Appl. No.: 16/224,622

(22) Filed: Dec. 18, 2018

(65) Prior Publication Data
US 2019/0224899 A1 Jul. 25, 2019

(30) Foreign Application Priority Data

Jan. 19, 2018 (JP) .................................. 2018-007646

(51) Int. Cl.
B29C 45/84 (2006.01)
B29C 45/76 (2006.01)
B29C 45/80 (2006.01)

(52) U.S. Cl.
CPC .......... B29C 45/844 (2013.01); B29C 45/768 (2013.01); B29C 45/80 (2013.01);
(Continued)

(58) Field of Classification Search
CPC ..... B29C 45/844; B29C 45/768; B29C 45/80; B29C 2945/76866; B29C 2945/76387; B29C 2945/76939; B29C 2945/76943; B29C 2945/76464; B29C 2945/76568; B29C 2945/76732; B29C 2945/76872;
(Continued)

(56) References Cited

U.S. PATENT DOCUMENTS

2004/0059452 A1* 3/2004 Kachnic ................. B29C 45/76
700/108
2005/0240303 A1* 10/2005 Smith ..................... B29C 45/80
700/200
2008/0206382 A1* 8/2008 Yokoyama ........... B22D 17/266
425/135

FOREIGN PATENT DOCUMENTS

JP H06198696 A 7/1994
JP H08057929 A 3/1996
(Continued)

OTHER PUBLICATIONS

Notification of Reasons for Refusal issued in the JP Patent Application No. 2018-007646, dated Oct. 8, 2019.

Primary Examiner — Joseph S Del Sole
Assistant Examiner — Mohamed K Ahmed Ali
(74) Attorney, Agent, or Firm — Studebaker & Brackett PC

(57) ABSTRACT

A controller includes a mold movement control unit that moves a movable mold between a first position separated from a fixed mold and a second position at which mold closing is completed; a determining unit determines the presence of abnormalities in at least one of the movable mold and the fixed mold on the basis of inspection information acquired from at least one of the movable mold and the fixed mold and outputs a confirmation signal related to the presence of abnormalities; and a mold stopping unit that stops movement of the movable mold on the basis of whether the confirmation signal output from the determining unit is acquired while a safety confirmation condition is satisfied after the mold movement control unit starts moving the movable mold from the first position toward the second position.

6 Claims, 8 Drawing Sheets

(52) U.S. Cl.
CPC ........ *B29C 2945/76167* (2013.01); *B29C 2945/76254* (2013.01); *B29C 2945/76257* (2013.01); *B29C 2945/76387* (2013.01); *B29C 2945/76394* (2013.01); *B29C 2945/76464* (2013.01); *B29C 2945/76568* (2013.01); *B29C 2945/76732* (2013.01); *B29C 2945/76866* (2013.01); *B29C 2945/76872* (2013.01); *B29C 2945/76939* (2013.01); *B29C 2945/76943* (2013.01)

(58) Field of Classification Search
CPC ......... B29C 2945/76394; B29C 2945/76254; B29C 2945/76167; B29C 2945/76257
See application file for complete search history.

(56) References Cited

FOREIGN PATENT DOCUMENTS

| | | | |
|---|---|---|---|
| JP | H10138314 A | | 5/1998 |
| JP | 2002166457 A | * | 6/2002 |
| JP | 2002-321266 A | | 11/2002 |
| JP | 2009269318 A | | 11/2009 |
| JP | 2012135949 A | | 7/2012 |

* cited by examiner

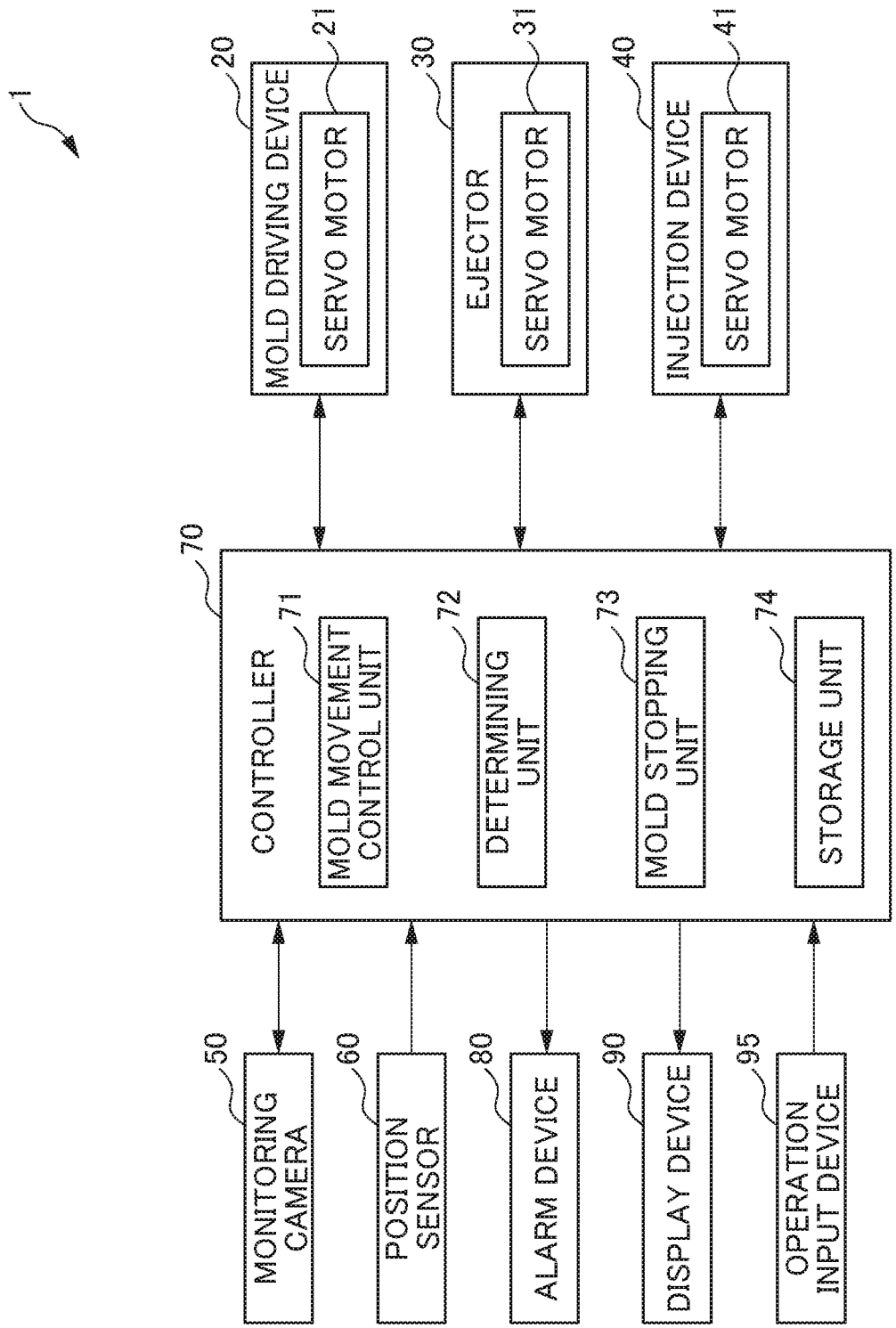

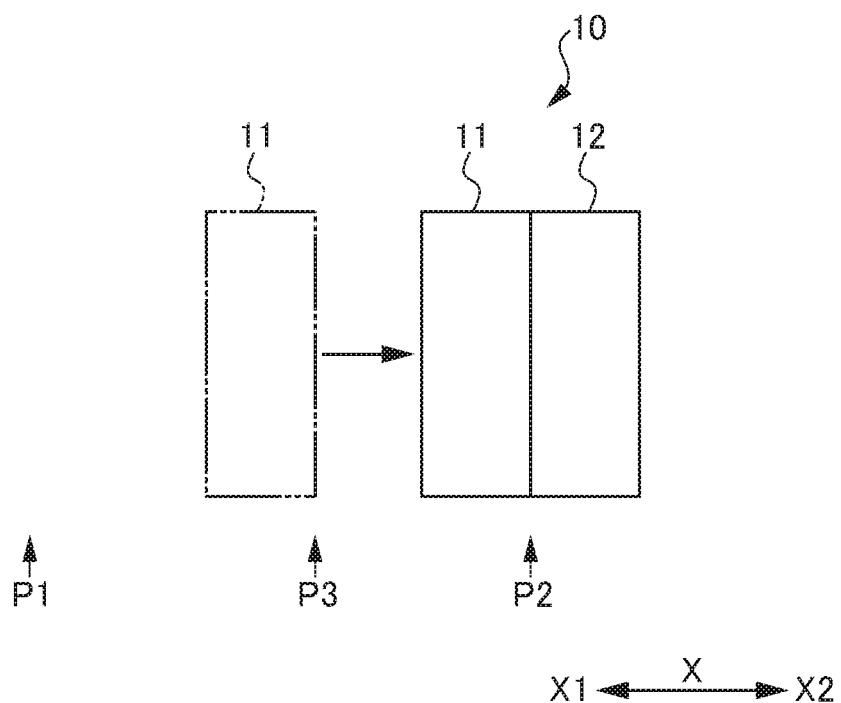

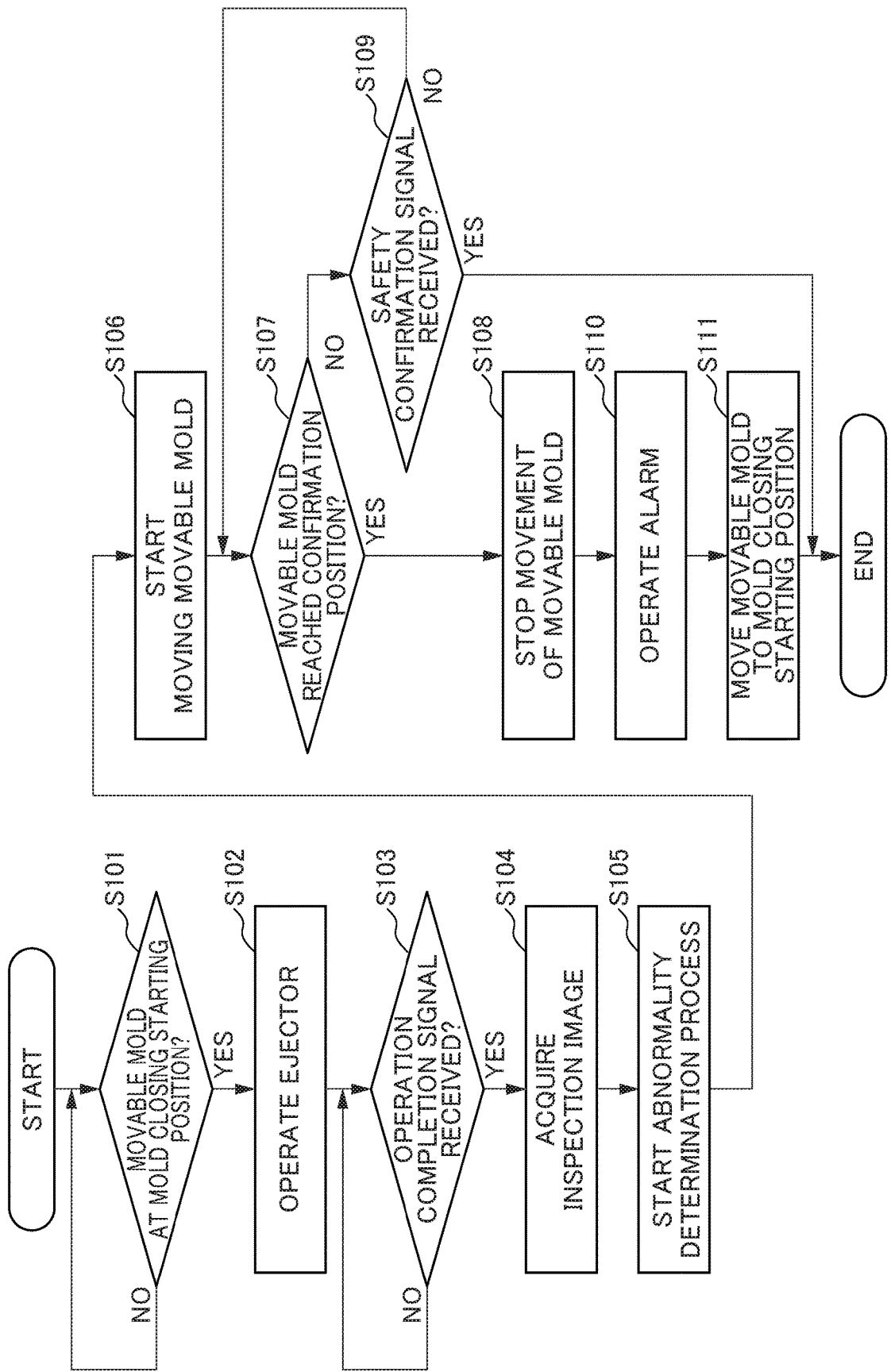

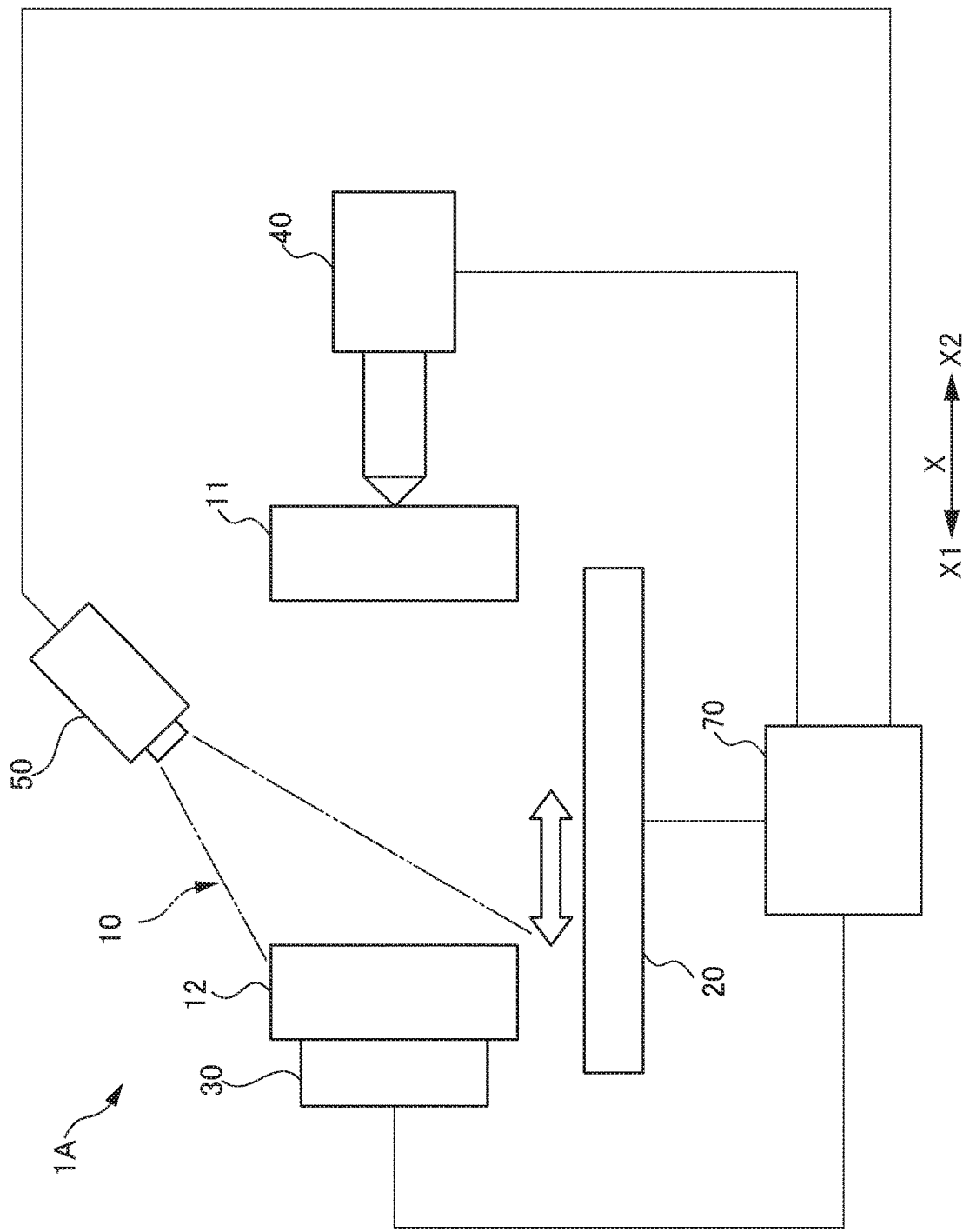

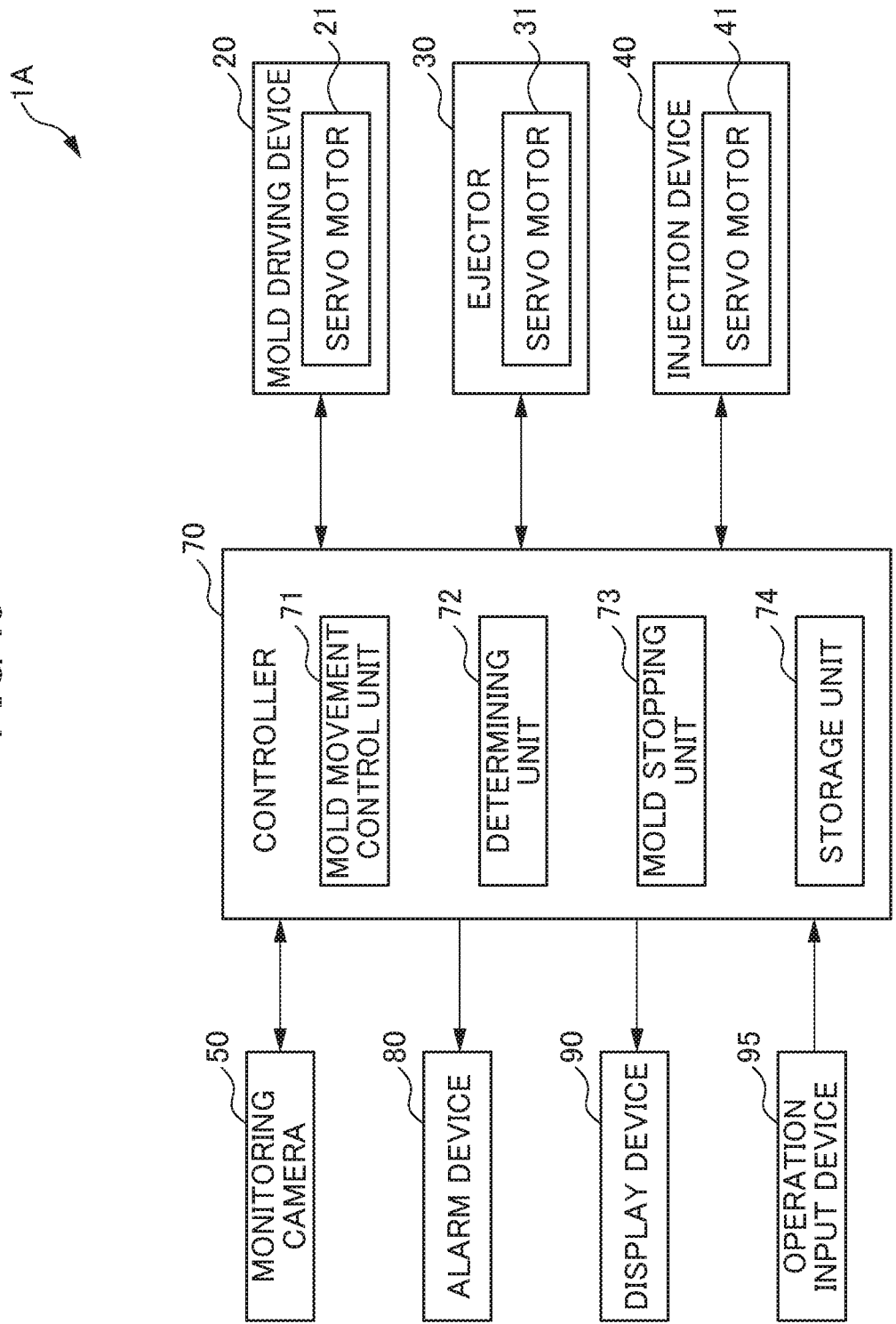

CONTROLLER FOR INJECTION MOLDING MACHINE

This application is based on and claims the benefit of priority from Japanese Patent Application No. 2018-007646, filed on 19 Jan. 2018, the content of which is incorporated herein by reference.

BACKGROUND OF THE INVENTION

Field of the Invention

The present invention relates to a controller for an injection molding machine.

Related Art

Conventionally, an injection molding machine that fills a molding material in a cavity formed when a movable mold and a fixed mold are closed to mold a molded product is known. In such an injection molding machine, the movable mold and the fixed mold are open, the molded product is ejected from the inside of the mold by an ejector, the movable mold and the fixed mold are closed, and then, a subsequent molding operation is performed. However, when the movable mold and the fixed mold are open, there is a case in which it is not possible to eject the molded product appropriately from the inside of the mold but the molded product remains inside the mold.

When a molding operation is performed by closing the movable mold and the fixed mold in a state in which the molded product remains inside the mold, molding defects resulting from the remaining molded product may occur and the mold may be broken. Therefore, a mold monitoring device in which a camera photographs the inner surface of the movable mold at a plurality of positions while the movable mold reciprocates with movement for the mold closing and opening operations, and it is determined whether the molded product has been ejected from the mold on the basis of whether two images photographed at respective positions during the reciprocation are identical is proposed.
Patent Document 1: Japanese Unexamined Patent Application, Publication No. 2002-321266

SUMMARY OF THE INVENTION

In the mold monitoring device that determines whether the molded product has been ejected from the mold on the basis of the images photographed by the camera, a period of approximately 50 to 300 ms is required until a determination result is output after photographing of the camera starts. On the other hand, in high-cycle molding in which one cycle made up of mold closing, molding, and mold opening is completed in 5 seconds or less, the time required for the mold closing is approximately 200 ms. Therefore, in a method of determining the presence of abnormalities in a mold on the basis of an image photographed by a camera, it is difficult to reduce the time required for one cycle of high-cycle molding. In high-cycle molding, since a time reduction of approximately 100 ms has a great influence on productivity, it is requested to further reduce the time required for one cycle.

An object of the present invention is to provide a controller for an injection molding machine, capable of appropriately determining whether a molded product has been ejected from a mold and further reducing the time required for one cycle of molding.

(1) The present invention provides a controller for an injection molding machine including a fixed mold and a movable mold movable between a first position separated from the fixed mold and a second position at which mold closing is completed, the injection molding machine filling a molding material in a cavity formed by closing the movable mold and the fixed mold to mold a molded product, the controller including: a mold movement control unit that moves the movable mold between the first position and the second position; a determining unit determines the presence of abnormalities in at least one of the movable mold and the fixed mold on the basis of inspection information acquired from at least one of the movable mold and the fixed mold and outputs a confirmation signal related to the presence of abnormalities; and a mold stopping unit that stops movement of the movable mold on the basis of whether the confirmation signal output from the determining unit is acquired while a safety confirmation condition is satisfied after the mold movement control unit starts moving the movable mold from the first position toward the second position.

(2) In the controller according to, the inspection information may be a photographed image obtained by photographing at least one of the movable mold and the fixed mold.

(3) In the controller according to, the determining unit may determine the presence of abnormalities in at least one of the movable mold and the fixed mold by comparing the photographed image with a reference image which is a normal photographed image of at least one of the movable mold and the fixed mold.

(4) In the controller according to, the determining unit may determine the presence of abnormalities in at least one of the movable mold and the fixed mold by digitizing features of the photographed image to obtain a value and comparing the value with a predetermined threshold.

(5) In the controller according to any one of to, the determining unit may determine the presence of abnormalities in the movable mold on the basis of the photographed image obtained when the movable mold stops at the first position.

(6) In the controller according to any one of to, the mold movement control unit may move the movable mold toward the first position after the movement of the movable mold is stopped by the mold stopping unit.

(7) The controller according to any one of to may further include: a safety confirmation condition acquisition unit that acquires an input safety confirmation condition; and a display unit that displays the safety confirmation condition acquired by the safety confirmation condition acquisition unit on a screen, and the safety confirmation condition used by the mold stopping unit may be changed to the safety confirmation condition acquired by the safety confirmation condition acquisition unit.

According to the present invention, it is possible to provide a controller for an injection molding machine, capable of appropriately determining whether a molded product has been ejected from a mold and further reducing the time required for one cycle of molding.

BRIEF DESCRIPTION OF THE DRAWINGS

FIG. 2 is a block diagram illustrating a functional configuration of the injection molding machine 1.

FIG. 3C is a schematic diagram when the movable mold 12 is moved from the confirmation position P3 to a mold closing completion position P2.

FIG. 4 is a flowchart illustrating a processing procedure of a control program executed by a controller 70.

FIG. 5 is a conceptual diagram illustrating an entire configuration of an injection molding machine 1A according to a second embodiment.

FIG. 6 is a block diagram illustrating a functional configuration of the injection molding machine 1A.

DETAILED DESCRIPTION OF THE INVENTION

Hereinafter, embodiments of the present invention will be described. The drawings attached to the present specification are schematic diagrams, and shapes, scales, dimensional ratios, and the like of respective portions are changed or exaggerated from the actual ones for better understanding of the invention.

First Embodiment

Figure 1:
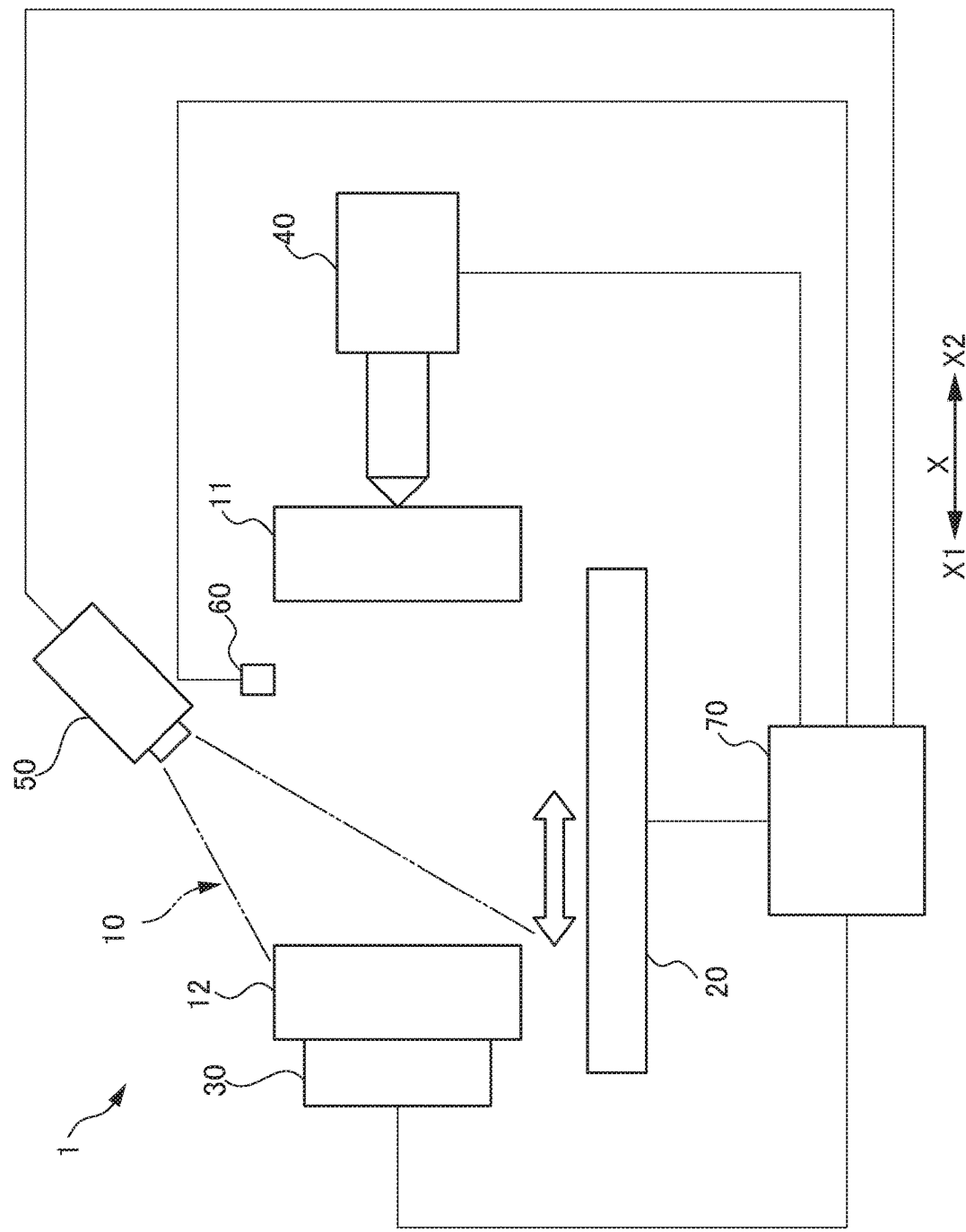
FIG. 1 is a conceptual diagram illustrating an entire configuration of an injection molding machine 1 according to a first embodiment.
Figure 3A:
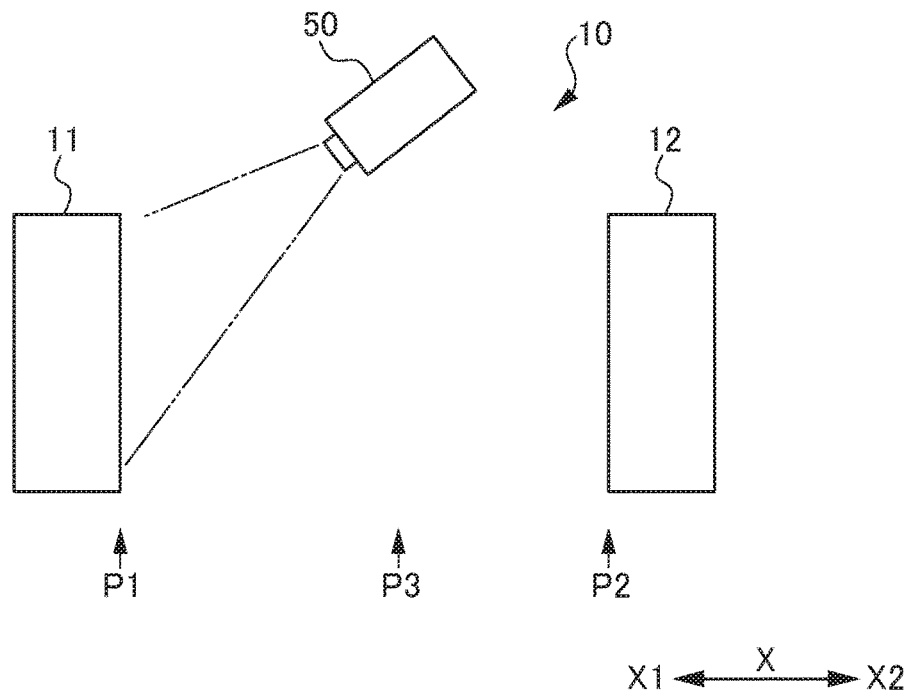
FIG. 3A is a schematic diagram when a movable mold 12 is moved to a mold closing starting position P1.

FIG. 1 is a schematic diagram illustrating an entire configuration of an injection molding machine 1 according to a first embodiment. FIG. 2 is a block diagram illustrating a functional configuration of the injection molding machine 1. In the present specification and the like, a moving direction of a movable mold 12 to be described later is defined as an X-direction. In the X-direction, a direction in which the movable mold 12 is separated from a fixed mold 11 is defined as an X1-direction, and a direction in which the movable mold 12 approaches the fixed mold 11 is defined as an X2-direction. In the first embodiment, a step in which the movable mold 12 moves from a mold closing starting position P1 to a mold closing completion position P2 and the movable mold 12 moves again to the mold closing starting position P1 after injection molding is completed will be referred to as "one cycle". The mold closing starting position P1 refers to a position at which the movable mold 12 stops temporarily when a molding closing operation starts as illustrated in FIG. 3A to be described later, for example. The mold closing completion position P2 refers to a position at which closing of the movable mold 12 and the fixed mold 11 is completed as illustrated in FIG. 3C to be described later, for example. FIG. 1 illustrates a state in which the movable mold 12 has moved to the mold closing starting position P1.

As illustrated in FIG. 1, the injection molding machine 1 of the first embodiment includes a mold 10, a mold driving device 20, an ejector 30, an injection device 40, a monitoring camera 50, a position sensor 60, a controller 70, an alarm device 80, a display device 90, and an operation input device 95.

The mold 10 includes the fixed mold 11 and the movable mold 12. The fixed mold 11 is a mold having a concave portion formed in a molding surface and is fixed to a predetermined position of the injection molding machine 1. In the fixed mold 11, a sprue hole to which the injection device 40 to be described later is connected is formed on a side opposite the molding surface.

The movable mold 12 is a mold having a convex portion formed on a molding surface and is provided to be movable in the X-direction in the mold driving device 20. In the movable mold 12, the ejector 30 is provided on the side opposite the molding surface.

When the movable mold 12 is moved to the mold closing completion position P2 to be described later and is clamped, a cavity made up of the concave portion and the convex portion is formed between the fixed mold 11 and the movable mold 12. By filling a molding material in the cavity from the injection device 40, a molded product is molded.

The mold driving device 20 is a device that moves the movable mold 12 in the X-direction in relation to the fixed mold 11. The mold driving device 20 includes a servo motor 21 of which the rotation direction and the rotation amount are controlled by the controller 70. The servo motor 21 is driven by a mold closing start signal transmitted from a mold movement control unit 71 to be described later to move the movable mold 12 being at the mold closing starting position P1 toward the mold closing completion position P2. The mold driving device 20 transmits a mold closing completion signal to the mold movement control unit 71 when the movable mold 12 moves to the mold closing completion position P2.

The servo motor 21 is driven by a mold opening start signal transmitted from the mold movement control unit 71 to move the movable mold 12 being at the mold closing completion position P2 to the mold closing starting position P1. The mold driving device 20 transmits a mold opening completion signal to the mold movement control unit 71 when the movable mold 12 moves to the mold closing starting position P1. The mold driving device 20 stops movement of the movable mold 12 upon receiving a movement stop signal from the mold stopping unit 73 to be described later while the movable mold 12 is moving from the mold closing starting position P1 to the mold closing completion position P2.

In the mold driving device 20, a system which combines a platen and a tie bar, for example, can be used as a mechanism for moving the movable mold 12. This system connects a fixed platen to which the fixed mold 11 is attached and a movable platen to which the movable mold 12 is attached so as to be movable by a plurality of tie bars. In this configuration, by moving the movable platen being at the mold closing starting position P1 in the direction of approaching the fixed platen along the tie bar, the movable mold 12 can be moved toward the mold closing completion position P2. By moving the movable platen being at the mold closing completion position P2 in the direction away from the fixed platen along the tie bar, the movable mold 12 can be moved to the mold closing starting position P1.

The ejector 30 is a device that ejects a molded product molded by the mold 10 from the movable mold 12. The ejector 30 includes a servo motor 31 of which the rotation direction and the rotation amount are controlled by the controller 70. The servo motor 31 is driven by an operation start signal transmitted from the controller 70 to eject a molded product from the molding surface of the movable mold 12 in such a way that an ejector pin protrudes from the X1-side surface of the movable mold 12 toward the X2-side molding surface. The ejector 30 operates with an operation start signal transmitted from the controller 70 and transmits an operation completion signal to the controller 70 when ejection of the molded product is completed.

The injection device 40 is a device that fills a molding material in the closed mold 10. The injection device 40 has a nozzle at a distal end thereof being connected to a sprue hole formed in the X2-side surface of the fixed mold 11. The injection device 40 includes a servo motor 41 of which the rotation direction and the rotation amount are controlled by the controller 70. The servo motor 41 is driven by an injection control signal transmitted from the controller 70 to rotate a screw mechanism provided in a cylinder of the injection device 40 to thereby fill a predetermined amount of molding material in the mold 10.

The monitoring camera 50 is a device that photographs the molding surface of the movable mold 12. A digital camera having a CCD or CMOS image sensor, for example, is used as the monitoring camera 50. The monitoring camera 50 photographs the molding surface of the movable mold 12 according to a photographing instruction signal transmitted from the controller 70. The images photographed by the monitoring camera 50 are stored in the controller 70. In the first embodiment, the inspection image is photographed while the movable mold 12 stops at the mold closing starting position P1.

Figure 3B:
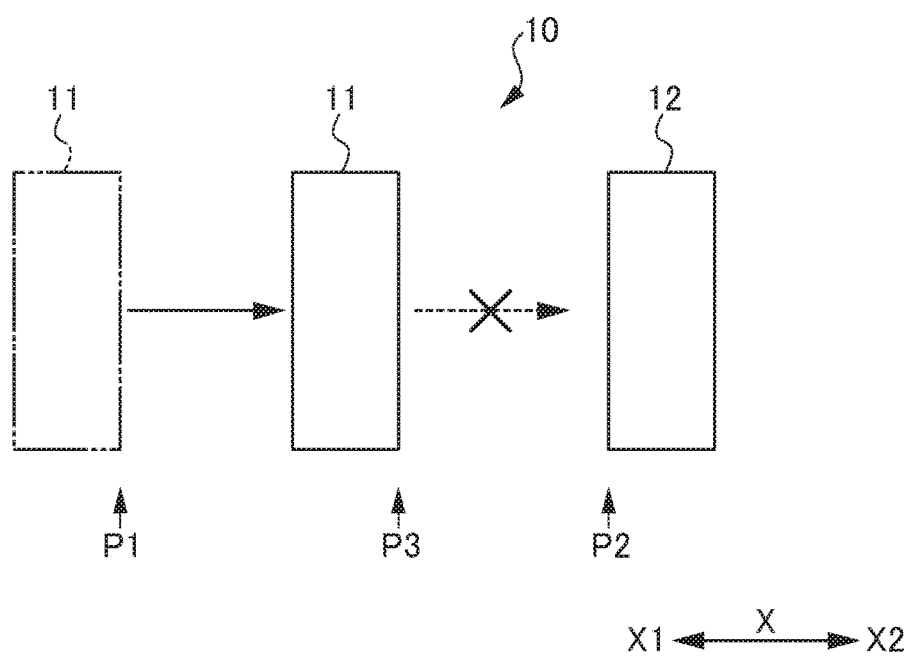
FIG. 3B is a schematic diagram when the movable mold 12 is moved from the mold closing starting position P1 to a confirmation position P3.

The position sensor 60 is a detection device that detects the movable mold 12 moving along the X-direction and an optical sensor, for example, is used. The position sensor 60 is provided at a confirmation position P3 set on a moving path of the movable mold 12. The position sensor 60 outputs a detection signal to the controller 70 upon detecting the movable mold 12. The confirmation position P3 is set to a position located closer to the X2-side than the mold closing starting position P1 and closer to the X1-side than the mold closing completion position P2 as illustrated in FIG. 3B to be described later, for example.

As will be described later, in the controller 70 of the first embodiment, immediately after the monitoring camera 50 photographs an inspection image of the movable mold 12 stopping at the mold closing starting position P1, the movable mold 12 is moved from the mold closing starting position P1 toward the mold closing completion position P2, and the determining unit 72 executes a process of determining the presence of abnormalities in the mold 10. When a safety confirmation signal is not received from the determining unit 72 until the movable mold 12 reaches the confirmation position P3, the controller 70 causes the mold driving device 20 to stop movement of the movable mold 12.

In order to realize the above-described control, the confirmation position P3 is set to a position at which the movable mold 12 can approach the fixed mold 11 without any problem even when a molded product remains on the molding surface of the movable mold 12. Therefore, even when a molded product remains on the movable mold 12, it is possible to move the movable mold 12 up to the confirmation position P3 in the direction toward the fixed mold 11. That is, in the first embodiment, a moving distance in which the movable mold 12 can approach from the mold closing starting position P1 toward the fixed mold 11 without any problem is secured "while a safety confirmation condition is satisfied".

By setting the confirmation position P3 in the above-described manner, the movable mold 12 can be moved toward the mold closing completion position P2 while the determining unit 72 is executing the abnormality determination process. The mold driving device 20 continues moving the movable mold 12 to the mold closing completion position P2 when a safety confirmation signal is received from the determining unit 72 until the movable mold 12 reaches the confirmation position P3. In this manner, according to the controller 70 of the first embodiment, since the movement of the movable mold 12 can be started without waiting for completion of the abnormality determination process of the determining unit 72, it is possible to further reduce the time required for one cycle of molding. The movement of the movable mold 12 is stopped by the mold driving device 20 when a safety confirmation signal is not received from the determining unit 72 until the movable mold 12 reaches the confirmation position P3. Therefore, according to the controller 70 of the first embodiment, it is possible to suppress occurrence of breakage or the like of the mold 10 when an abnormality occurs.

The confirmation position P3 is preferably set to a position as close to the fixed mold 11 as possible from the viewpoint of securing a sufficient time for the abnormality determination process of the determining unit 72. However, depending on the shape of the molded product, the molding surface, and the like, it may be not possible to set the confirmation position P3 to a position near the fixed mold 11. For example, when a molded product is narrow in an injection direction and a mold has very small pins or the like, a position at which the movable mold 12 can approach the fixed mold 11 without any problem is distant from the fixed mold 11. In this case, in order to prevent a molded product remaining in the movable mold 12 during mold closing from being sandwiched between the fixed mold 11 and the movable mold 12, the confirmation position P3 needs to be set to a position near the mold closing starting position P1. When the molded product is a very small one, the position at which the movable mold 12 can approach the fixed mold 11 without any problem is a position closer to the fixed mold 11. In this case, the confirmation position P3 can be set to a position close to the mold closing completion position P2.

The controller 70 is a device that is electrically connected to respective devices such as the mold driving device 20, the ejector 30, and the injection device 40 of the injection molding machine 1 and controls the operations of the respective devices. Specifically, the controller 70 controls the operation of the mold driving device 20 closing and opening the mold 10, the operation of the ejector 30 ejecting a molded product, the operation of the injection device 40 ejecting a molding material, the operation of the alarm device 80 notifying of an abnormality, and the like.

The controller 70 is configured as a micro-processor unit including a central processing unit, a memory, and the like. The controller 70 realizes various functions in cooperation with respective hardware components by reading an application program for controlling the injection molding machine 1 from a storage unit 74 and executing the program.

As illustrated in FIG. 2, the controller 70 includes a mold movement control unit 71, a determining unit 72, a mold stopping unit 73, and a storage unit 74. The mold movement control unit 71 moves the movable mold 12 to a position between the mold closing starting position P1 and the mold closing completion position P2. When one cycle of injection molding starts, the mold movement control unit 71 transmits a mold closing start signal to the mold driving device 20 to move the movable mold 12 from the mold closing starting position P1 toward the mold closing completion position P2. When injection molding of the injection device 40 is completed, the mold movement control unit 71 transmits a mold opening start signal to the mold driving device 20 to move the movable mold 12 from the mold closing completion position P2 to the mold closing starting position P1.

Upon receiving an operation completion signal transmitted from the ejector 30 while the movable mold 12 stops at the mold closing starting position P1, the determining unit 72 transmits a photographing instruction signal to the monitoring camera 50 to cause the monitoring camera 50 to photograph the molding surface of the movable mold 12.

The determining unit 72 obtains the image photographed by the monitoring camera 50 and stores the image in the storage unit 74.

After the inspection image is acquired, the determining unit 72 determines the presence of an abnormality in the mold 10 by comparing the inspection image stored in the storage unit 74 with a reference image stored in the storage unit 74. For example, the presence of an abnormality in the mold 10 is determined by checking whether the inspection image is identical to the reference image using a pattern matching method. When it is determined that there is no abnormality in the mold 10, the determining unit 72 outputs a safety confirmation signal to the mold stopping unit 73. When it is determined that there is an abnormality in the mold 10, the determining unit 72 does not output a safety confirmation signal to the mold stopping unit 73. The determining unit 72 may output an abnormality confirmation signal to the mold stopping unit 73 when it is determined that there is an abnormality.

When a safety confirmation signal is not received from the determining unit 72 until the movable mold 12 reaches the confirmation position P3 after the movable mold 12 started moving from the mold closing starting position P1 toward the mold closing completion position P2, the mold stopping unit 73 transmits a movement stop signal to the mold driving device 20 to stop movement of the movable mold 12. In this case, the movable mold 12 stops at the confirmation position P3 without moving up to the mold closing completion position P2. The mold stopping unit 73 transmits an abnormality notification signal to the alarm device 80.

On the other hand, when the safety confirmation signal is received from the determining unit 72 until the movable mold 12 reaches the confirmation position P3, the mold stopping unit 73 continues moving the movable mold 12 without transmitting a movement stop signal to the mold driving device 20. In this case, the movable mold 12 moves up to the mold closing completion position P2. The mold stopping unit 72 determines that the movable mold 12 has reached the confirmation position P3 when a detection signal is received from the position sensor 60.

The storage unit 74 is a storage device in which various programs executed by the injection molding machine 1, data, and the like are stored. The storage unit 74 is configured as a semiconductor memory, a hard disk device, and the like, for example. For example, the inspection image photographed by the monitoring camera 50 and a reference image which is an image of the normal molding surface of the movable mold 12 are stored in the storage unit 74 as image data. A mold moving and connecting control program, for example, is stored in the storage unit 74, as an application program.

The alarm device 80 is a device that informs an operator of the fact that the determining unit 72 has determined that there is an abnormality. When an abnormality notification signal is received from the mold stopping unit 73, the alarm device 80 outputs an alarm sound and turns a warning light on or off, for example. The alarm device 80 may be provided at an arbitrary position as long as it is possible to notify an operator of an abnormality.

The display device 90 is a display device capable of displaying various pieces of data, message, figures, and the like. The display device 90 displays simulation images corresponding to FIGS. 3A to 3C, an input frame 91 for designating an arbitrary position between molds, and the like, for example.

Figure 7:
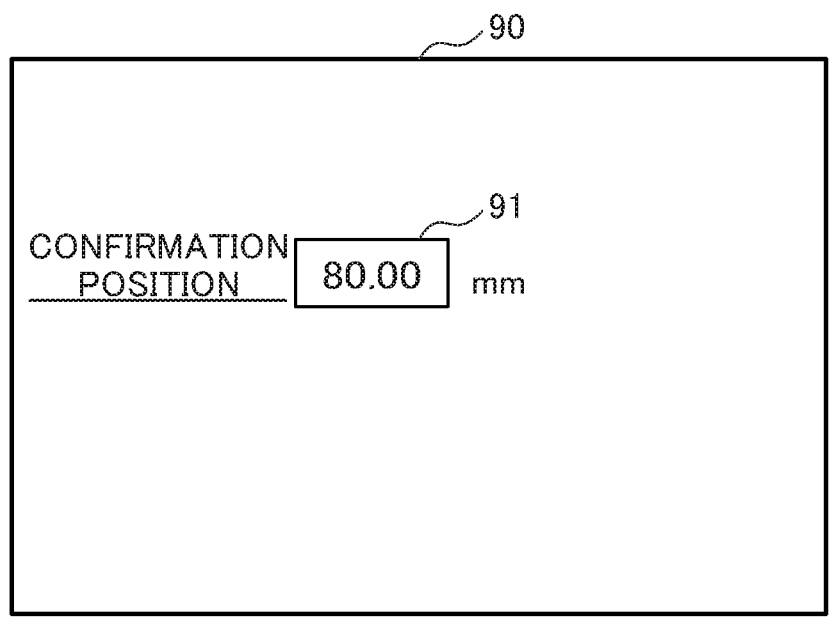
FIG. 7 is a conceptual diagram illustrating an example of a display screen of a display device 90.

Here, an example in which an input confirmation position P3 is displayed on the display screen of the display device 90 will be described. FIG. 7 is a conceptual diagram illustrating an example of a display screen of the display device 90. As illustrated in FIG. 7, an operator can display the confirmation position P3 in the input frame 91 displayed on the display device 90 by inputting a desired number from a keyboard of the operation input device 95 to be described later, for example. The input value of the confirmation position P3 can be changed. When the value of the confirmation position P3 is changed, the mold stopping unit 73 to be described later performs control on the basis of the changed value of the confirmation position P3.

A configuration in which the input confirmation position P3 is displayed on the display screen is not limited to the above-described example, but an arbitrary configuration may be used. For example, a cursor bar may be displayed on the display device 90, and an operation of indicating a desired position may be performed on the cursor bar using a mouse, a touch panel, or the like of the operation input device 95.

The operation input device 95 is a device with which an operator can input various pieces of character information, number data, manipulation instructions, operation instructions, and the like. The operation input device 95 is configured, for example, as a keyboard, a mouse, a touch panel, or the like. An operator can designate the above-described confirmation position P3 and input the time from the start of mold closing to be described later by operating the operation input device 95 while viewing an image displayed on the display device 90. Various pieces of information such as data and instructions input from the operation input device 95 are stored in the storage unit 56 by an input control unit.

Next, the operation of the controller 70 of the first embodiment will be described with reference to FIG. 2 and FIGS. 3A to 3C. FIGS. 3A to 3C are schematic diagrams illustrating a series of operations of the mold 10. FIG. 3A is a schematic diagram when the movable mold 12 is moved to the mold closing starting position P1. FIG. 3B is a schematic diagram when the movable mold 12 is moved from the mold closing starting position P1 up to the confirmation position P3. FIG. 3C is a schematic diagram when the movable mold 12 is moved from the confirmation position P3 up to the mold closing completion position P2.

In FIGS. 3A to 3C, the mold driving device 20, the ejector 30, the injection device 40, and the like illustrated in FIG. 1 are not illustrated. In FIGS. 3B and 3C, the monitoring camera 50 is not illustrated. In FIGS. 3A to 3C, P1 indicated by an upward arrow indicates a mold closing starting position. In FIGS. 3A to 3C, P2 indicated by an upward arrow indicates a mold closing completion position. In FIGS. 3A to 3C, P3 indicated by an upward arrow indicates a confirmation position at which the position sensor 60 is provided.

As illustrated in FIG. 3A, when the movable mold 12 stops at the mold closing starting position P1, the determining unit 72 transmits a photographing instruction signal to the monitoring camera 50 to cause the monitoring camera 50 to photograph the molding surface of the movable mold 12. The inspection image of the molding surface photographed by the monitoring camera 50 is stored in the storage unit 74. When photographing of the inspection image by the monitoring camera 50 is completed, the mold movement control unit 71 transmits a movement start signal to the mold driving device 20 to move the movable mold 12 toward the mold closing completion position P2. When the inspection image is photographed by the monitoring camera 50, the determining unit 72 starts performing a process of comparing the inspection image with the reference image stored in the storage unit 74 and determining the presence of an abnormality in the mold 10.

When a safety confirmation signal is not received from the determining unit 72 until the movable mold 12 reaches the confirmation position P3 after the mold movement control unit 71 causes the movable mold 12 to start moving from the mold closing starting position P1 toward the mold closing completion position P2, the mold stopping unit 73 transmits a movement stop signal to the mold driving device 20 to stop movement of the movable mold 12 as illustrated in FIG. 3B. When a safety confirmation signal is received from the determining unit 72 until the movable mold 12 reaches the confirmation position P3 after the mold movement control unit 71 causes the movable mold 12 to start moving toward the mold closing completion position P2, the mold stopping unit 73 does not transmit a movement stop signal to the mold driving device 20. In this way, as illustrated in FIG. 3C, the movable mold 12 moves up to the mold closing completion position P2 to make close contact with the fixed mold 11.

As described above, in the controller 70 of the first embodiment, immediately after the monitoring camera 50 photographs an inspection image of the movable mold 12 at the mold closing starting position P1, the movable mold 12 is moved from the mold closing starting position P1 toward the mold closing completion position P2, and the determining unit 72 executes a process of determining the presence of abnormalities in the mold 10. When a safety confirmation signal is not received from the determining unit 72 until the movable mold 12 reaches the confirmation position P3, the controller 70 stops movement of the movable mold 12.

The confirmation position P3 is set to a position at which the movable mold 12 can approach the fixed mold 11 without any problem even when a molded product remains on the molding surface of the movable mold 12. Therefore, even when the movable mold 12 is moved toward the mold closing completion position P2 before the process of determining the presence of abnormalities in the mold 10 is completed, breakage or the like of the mold 10 does not occur even when a molded product remains on the movable mold 12 until the movable mold 12 reaches the confirmation position P3. Since movement of the movable mold 12 stops when a safety confirmation signal is not received from the determining unit 72 until the movable mold 12 reaches the confirmation position P3, it is possible to suppress the occurrence of breakage or the like of the mold 10. Movement of the movable mold 12 continues when a safety confirmation signal is received from the determining unit 72 until the movable mold 12 reaches the confirmation position P3. In this manner, according to the controller 70 of the first embodiment, since the movement of the movable mold 12 can be started without waiting for completion of the abnormality determination process of the determining unit 72, it is possible to further reduce the time required for one cycle of molding. Therefore, according to the controller 70 of the first embodiment, it is possible to determine whether a molded product has been ejected from the mold 10 appropriately and to further reduce the time required for one cycle of molding.

Next, the content of processing of the control program executed by the controller 70 of the first embodiment will be described on the basis of the schematic diagram illustrated in FIGS. 3A to 3C and the flowchart illustrated in FIG. 4.

FIG. 4 is a flowchart illustrating a processing procedure of the control program executed by the controller 70 of the first embodiment.

In step S101 illustrated in FIG. 4, the mold movement control unit 71 determines whether the movable mold 12 is moving toward the mold closing starting position P1. When the mold movement control unit 71 determines in step S101 that the movable mold 12 is moving toward the mold closing starting position P1, the flow proceeds to step S102. On the other hand, when the mold movement control unit 71 determines that the movable mold 12 is not moving toward the mold closing starting position P1, the flow proceeds to step S101. The mold movement control unit 71 determines that the movable mold 12 has moved to the mold closing starting position P1 when a mold opening completion signal is received from the mold driving device 20.

In step S102, the controller 70 transmits an operation start signal to the ejector 30 to eject a molded product from the molding surface of the movable mold 12. The ejector 30 operates according to an operation start signal transmitted from the controller 70 and transmits an operation completion signal to the controller 70 when ejection of the molded product is completed.

In step S103, the controller 70 determines whether an operation completion signal is received from the ejector 30. When an operation completion signal is received from the ejector 30, it can be determined that the molded product is ejected from the movable mold 12 and the movable mold 12 stops at the mold closing starting position P1. When the controller 70 determines in step S103 that the operation completion signal has been received, the flow proceeds to step S104. On the other hand, when the controller 70 determines that the operation completion signal has not been received, the flow proceeds to step S103.

In step S104, the determining unit 72 causes the monitoring camera 50 to photograph the molding surface of the movable mold 12 to acquire an inspection image. The inspection image photographed by the monitoring camera 50 is stored in the storage unit 74.

In step S105, the determining unit 72 starts an abnormality determination process by comparing the inspection image acquired in step S104 with a reference image. When it is determined in the abnormality determination process that an abnormality has not occurred, the determining unit 72 outputs a safety confirmation signal to the mold stopping unit 73.

In step S106, the mold movement control unit 71 transmits a mold closing start signal to the mold driving device 20 to move the movable mold 12 from the mold closing starting position P1 toward the mold closing completion position P2. The processes of steps S105 and S106 may start in a reverse order and may start simultaneously.

In step S107, the mold stopping unit 73 determines whether the movable mold 12 has reached the confirmation position P3. The mold stopping unit 73 determines that the movable mold 12 has reached the confirmation position P3 when a detection signal is received from the position sensor 60. When the mold stopping unit 73 determines in step S107 that the movable mold 12 has reached the confirmation position P3, the flow proceeds to step S108. On the other hand, when the mold stopping unit 73 determines in step S107 that the movable mold 12 has not reached the confirmation position P3, the flow proceeds to step S109.

Here, first, the process of step S109 will be described. In step S109, the mold stopping unit 73 determines whether a safety confirmation signal has been received from the determining unit 72. When the mold stopping unit 73 determines in step S109 that the safety confirmation signal has been received from the determining unit 72, the process of this flowchart ends.

In this manner, when a safety confirmation signal is received from the determining unit 72 until the movable mold 12 reaches the confirmation position P3 after the movable mold 12 starts moving toward the mold closing completion position P2, it is not necessary to stop the movement of the movable mold 12. Therefore, when a determination result of YES is obtained in step S109, stopping of the movable mold 12 by the mold stopping unit 73 is canceled. In this case, the movable mold 12 moves from the confirmation position P3 up to the mold closing completion position P2. After that, an injection molding process is executed by the injection device 40.

On the other hand, when the mold stopping unit 73 determines in step S109 that a safety confirmation signal is not received from the determining unit 72, the flow proceeds to step S107. After that, the processes of steps S107 and S109 are executed repeatedly until the mold stopping unit 73 determines in step S107 that the movable mold 12 has reached the confirmation position P3 or the mold stopping unit 73 determines in step S109 that the safety confirmation signal is received from the determining unit 72.

In step S108, the mold stopping unit 73 transmits a movement stop signal to the mold driving device 20 to stop the movement of the movable mold 12. When a determination result of YES is obtained in step S107, it is highly likely that an abnormality such as a molded product remaining on the molding surface of the movable mold 12 has occurred. Therefore, the movement of the movable mold 12 is stopped by the mold stopping unit 73.

In step S110, the mold stopping unit 73 transmits an abnormality notification signal to the alarm device 80. In this way, the alarm device 80 notifies of the occurrence of an abnormality for a predetermined period by outputting an alarm sound or turning on a warning light.

In step S111, the mold movement control unit 71 moves the movable mold 12 of which the movement is stopped by the mold stopping unit 73 to the mold closing starting position P1. In this manner, when it is determined that there is an abnormality in the molding surface, the movable mold 12 moves up to the mold closing starting position P1 automatically after the alarm device 80 notifies of the occurrence of an abnormality for a predetermined period. When the movable mold 12 moves from the stopped position toward the mold closing starting position P1, a wide space is formed between the movable mold 12 and the fixed mold 11. Therefore, an operator can remove a molded product remaining in the movable mold 12 easily and quickly.

After step S111 is performed, when an operator performs a reset operation, for example, the process of this flowchart ends. When the operator performs a reset operation on the controller 70 via the operation input device 95, a molding process is resumed from a state in which the movable mold 12 is at the mold closing starting position P1, and the movable mold 12 starts moving toward the mold closing completion position P2.

According to the controller 70 of the first embodiment, the following advantages are obtained. According to the controller 70 of the first embodiment, the mold stopping unit 73 stops the movement of the movable mold 12 when a safety confirmation signal is not received from the determining unit 72 until the movable mold 12 reaches the confirmation position P3 after the movable mold 12 starts moving from the mold closing starting position P1 toward the mold closing completion position P2. In this way, it is possible to move the movable mold 12 toward the mold closing completion position P2 while the determining unit 72 is executing an abnormality determination process. The mold driving device 20 continues moving the movable mold 12 when a safety confirmation signal is received from the determining unit 72 until the movable mold 12 reaches the confirmation position P3. In this manner, according to the controller 70 of the first embodiment, since the movement of the movable mold 12 can be started without waiting for completion of the abnormality determination process of the determining unit 72, it is possible to further reduce the time required for one cycle of molding.

According to the controller 70 of the first embodiment, the mold stopping unit 73 stops movement of the movable mold 12 when a safety confirmation signal is not received from the determining unit 72 until the movable mold 12 reaches the confirmation position P3. Therefore, according to the controller 70 of the first embodiment, it is possible to suppress the occurrence of breakage or the like of the mold 10 when an abnormality occurs even when the movable mold 12 is moved at a speed at which the closing of the mold 10 is completed within a period required for high-cycle molding. Therefore, according to the controller 70 of the first embodiment, it is possible to determine whether a molded product has been ejected from the mold appropriately and to further reduce the time required for one cycle of molding.

In the controller 70 of the first embodiment, the monitoring camera 50 photographs the inspection image while the movable mold 12 stops at the mold closing starting position P1. Therefore, according to the controller 70 of the first embodiment, the monitoring camera 50 can photograph the inspection image more clearly and stably.

The controller 70 of the first embodiment uses the image photographed by the monitoring camera 50 as the inspection information of the movable mold 12. Therefore, according to the controller 70 of the first embodiment, it is possible to store and process the inspection information acquired from the movable mold 12 more simply.

The controller 70 of the first embodiment determines the presence of abnormalities in the mold 10 by comparing the inspection image photographed by the monitoring camera 50 with a reference image. Therefore, an existing method such as pattern matching, for example, can be used for comparison between the inspection image and the reference image. Therefore, according to the controller 70 of the first embodiment, it is possible to compare the inspection image and the reference image more accurately and more quickly.

Second Embodiment

FIG. 5 is a conceptual diagram illustrating an entire configuration of an injection molding machine 1A of the second embodiment. FIG. 6 is a block diagram illustrating a functional configuration of the injection molding machine 1A. As illustrated in FIG. 5, the injection molding machine 1A of the second embodiment is different from the first embodiment in that the position sensor 60 is not provided. The other basic configuration of the injection molding machine 1A of the second embodiment is the same as that of the first embodiment. In the description and the drawings of the second embodiment, members and the like equivalent to those of the first embodiment will be denoted by the same reference numerals as those of the first embodiment, and the redundant description thereof will be omitted.

The mold stopping unit 73 of the second embodiment determines whether the movable mold 12 has reached the confirmation position P3 on the basis of a rotation amount of the servo motor 21 of the mold driving device 20. The rotation amount of the servo motor 21 is detected by a pulse coder connected to the servo motor 21 and is transmitted to the mold stopping unit 73 as a pulse signal. In the mold driving device 20, the number of pulse signals transmitted until the movable mold 12 moves from the mold closing starting position P1 up to the confirmation position P3 is measured and is stored in the storage unit 74 as a target value. The mold stopping unit 73 counts the number of pulses transmitted from the servo motor 21 and determines that the movable mold 12 has reached the confirmation position P3 when the counted number has reached a target value stored in the storage unit 74.

The processing procedure of a mold monitoring program executed by the controller 70 of the second embodiment is substantially the same as the flowchart illustrated in FIG. 4. In step S107, the mold stopping unit 73 of the second embodiment determines that the movable mold 12 has reached the confirmation position P3 when the total number of pulse signals transmitted from the mold driving device 20 has reached the target value. The other processes are the same as those of the first embodiment, and the description thereof will be omitted. A method by which the mold stopping unit 73 of the second embodiment detects the position of the movable mold 12 may be applied to the first and third embodiments to be described later.

Third Embodiment

A method by which the determining unit 72 of the third embodiment determines the presence of abnormalities in the mold 10 is different from that of the first and second embodiments. The other configuration of the injection molding machine of the third embodiment is the same as that of the first and second embodiment. Therefore, in the third embodiment, the block diagrams illustrating the entire configuration and the functional configuration of the injection molding machine are omitted. Hereinafter, the content of processing of the determining unit 72 of the third embodiment will be described by citing the configuration of the injection molding machine 1 of the first embodiment. In the description and the drawings of the third embodiment, members and the like equivalent to those of the first embodiment will be denoted by the same reference numerals as those of the first embodiment, and the redundant description thereof will be omitted.

The determining unit 72 of the third embodiment is different from those of the first and second embodiment in that the determining unit 72 determines the presence of abnormalities in the mold 10 by digitizing the feature of the image photographed by the monitoring camera 50 as a score value and comparing the score value with a threshold stored in the storage unit 74. In the determining unit 72 of the third embodiment, examples of the feature of the photographed image include a color area of a photographed image, an average brightness, and the number of two-valued monochrome pixels. For these respective items, a value obtained from a normal molding surface of the movable mold 12 is stored in the storage unit 74 as a threshold. The determining unit 72 determines the presence of abnormalities in the mold 10 by comparing the score value of the image photographed by the monitoring camera 50 and the threshold stored in the storage unit 74.

According to the third embodiment, it is possible to determine the presence of abnormalities at a higher speed than the method of determining the presence of abnormalities using the pattern matching method like the determining unit 72 of the first and second embodiments. The process of the determining unit 72 of the third embodiment can be applied to the first and second embodiments.

While the embodiments of the present invention have been described, the present invention is not limited to the above-described embodiments. Various modifications and changes can be made like modifications to be described later, and these embodiments also fall within the technical scope of the present invention. The advantages described in the embodiments are only examples of most preferable effects produced by the present invention, and the advantages of the present invention are not limited to those described in the embodiments. The above-described embodiments and the modifications to be described later can be appropriately used in combination, and the detailed description thereof will be omitted.

Modification

In the respective embodiments, although the molding surface of the movable mold 12 is photographed to obtain the inspection image has been described, there is no limitation thereto. The molding surface of the fixed mold 11 may be photographed to obtain the inspection image, and the molding surfaces of both the fixed mold 11 and the movable mold 12 may be photographed to obtain the inspection image. The inspection information acquired from the mold is not limited to the image photographed by the monitoring camera 50, and distance information detected by a displacement sensor between the molding surface of the movable mold 12 and the displacement sensor may be used. When a molded product remains on the molding surface of the movable mold 12, the distance between the molding surface and the displacement sensor is smaller than that in a normal state in which a molded product does not remain on the molding surface. Therefore, it is possible to determine the presence of abnormalities by comparing the distance detected in the normal state and the distance detected during molding.

The inspection information acquired from the mold may be temperature information detected by a temperature sensor on the molding surface of the movable mold 12. When a molded product remains on the molding surface of the movable mold 12, the temperature information detected by the temperature sensor has a value different from that in a normal state in which a molded product does not remain. Therefore, it is possible to determine the presence of abnormalities by comparing the value of the temperature information in the normal state and the value of the temperature information detected during molding.

In the respective embodiments, although an example in which the monitoring camera 50 photographs an inspection image while the movable mold 12 stops at the mold closing starting position P1 has been described, there is no limitation thereto. The inspection image may be photographed by the monitoring camera 50 while the movable mold 12 is moving at a lower speed than a normal speed near the mold closing starting position P1. In this case, it is possible to reduce the time required for the monitoring camera 50 to photograph the inspection image while the movable mold 12 stops.

In the respective embodiments, although an example in which the monitoring camera 50 photographs the inspection image when the controller 70 receives the operation completion signal transmitted from the ejector 30 while the movable mold 12 stops at the mold closing starting position P1 has been described, there is no limitation thereto. For example, in a configuration including a device that takes out a molded product from a mold using a robot arm, the monitoring camera 50 may photograph the inspection image when the controller 70 receives the operation completion signal of the robot arm.

In the respective embodiments, the speed of moving the movable mold 12 may be constant and may be variable. For example, the movable mold 12 may be moved at a lower speed than a normal speed in an allowable range when the movable mold 12 moves between the mold closing starting position P1 and the confirmation position P3. By performing such control, it is possible to secure a longer period required for the determining unit 72 to perform an abnormality determination process.

In the first and third embodiments, an example in which an optical sensor is used as the position sensor 60 that detects the movable mold 12 arriving at the confirmation position P3 has been described, there is no limitation thereto. For example, an electrostatic capacitance-type proximity sensor, an induction-type proximity sensor, a magnetic proximity sensor, and the like can be used. A contact sensor such as a limit switch, for example, may be used without being limited to a non-contact sensor.

In the respective embodiments, although an example in which a concept of a length such as "confirmation position" is set as a safety confirmation condition for moving the movable mold 12 regardless of whether a molded product remains on the movable mold 12 has been described, there is no limitation thereto. The safety confirmation condition may be time. For example, when the speed at which the mold driving device 20 moves the movable mold 12 is constant, the time taken until the movable mold 12 reaches from the mold closing starting position P1 to the confirmation position P3 can be calculated by [distance/speed]. Therefore, it is possible to detect the movable mold 12 arriving at a predetermined position by measuring the time elapsed after the movable mold 12 starts moving from the mold closing starting position P1 toward the mold closing completion position P2. In such an embodiment, "while a safety confirmation condition is satisfied" is the time elapsed in which the movable mold 12 can approach the fixed mold 11 from the mold closing starting position P1 without any problem.

In the respective embodiments, although an example in which the controller 70 stops the movement of the movable mold 12 when a safety confirmation signal is not received from the determining unit 72 until the movable mold 12 reaches the confirmation position P3 has been described, there is no limitation thereto. The controller 70 may stop the movement of the movable mold 12 when an abnormality confirmation signal is received from the determining unit 72 until the movable mold 12 reaches the confirmation position P3. The abnormality confirmation signal is a signal output when the determining unit 72 determines that there is an abnormality in the inspection image.

In the respective embodiments, although an example in which the ejector 30 ejects a molded product from the molding surface of the movable mold 12 by protruding the ejector pin has been described, there is no limitation thereto. The ejector 30 may be a mechanism that ejects the molded product by moving a plate or using air or the like.

EXPLANATION OF REFERENCE NUMERALS

1: Injection molding machine
10: Mold
11: Fixed mold
12: Movable mold
20: Mold driving device
30: Ejector
40: Injection device
50: Monitoring camera
60: Position sensor
70: Controller
71: Mold movement control unit
72: Determining unit
73: Mold stopping unit
74: Storage unit
80: Alarm device
90: Display device
95: Operation input device
P1: Mold closing starting position
P2: Mold closing completion position
P3: Confirmation position

What is claimed is:

1. A controller for an injection molding machine including a fixed mold and a movable mold movable between a first position separated from the fixed mold and a second position at which mold closing is completed, the injection molding machine filling a molding material in a cavity formed by closing the movable mold and the fixed mold to mold a molded product, the controller comprising:
   a device that acquires inspection information from at least one of the movable mold or the fixed mold only when the movable mold moves to the first position;
   a mold movement control unit that controls to move the movable mold between the first position and the second position, and, when the inspection information is acquired by the device while the movable mold is stopped at the first position, starts to move the movable mold from the first position toward the second position;
   a determining unit that determines, when the inspection information is acquired by the device while the movable mold is stopped at the first position, the presence of abnormalities in at least one of the movable mold and the fixed mold on the basis of the inspection information and outputs a confirmation signal related to the presence of abnormalities; and
   a mold stopping unit that stops movement of the movable mold on the basis of whether the confirmation signal output from the determining unit is acquired while a safety confirmation condition is satisfied after the mold movement control unit starts moving the movable mold from the first position toward the second position.

2. The controller for the injection molding machine according to claim 1, wherein
   the inspection information is a photographed image obtained by photographing at least one of the movable mold and the fixed mold.

3. The controller for the injection molding machine according to claim 2, wherein
   the determining unit determines the presence of abnormalities in at least one of the movable mold and the fixed mold by comparing the photographed image with a reference image which is a normal photographed image of at least one of the movable mold and the fixed mold.

4. The controller for the injection molding machine according to claim 2, wherein
   the determining unit determines the presence of abnormalities in at least one of the movable mold and the fixed mold by digitizing features of the photographed image to obtain a value and comparing the value with a predetermined threshold.

5. The controller for the injection molding machine according to claim 2, wherein
the determining unit determines the presence of abnormalities in the movable mold on the basis of the photographed image obtained when the movable mold stops at the first position.

6. The controller for the injection molding machine according to claim 1, further comprising:
a safety confirmation condition acquisition unit that acquires an input safety confirmation condition; and
a display unit that displays the safety confirmation condition acquired by the safety confirmation condition acquisition unit on a screen, wherein
the safety confirmation condition used by the mold stopping unit is changed to the safety confirmation condition acquired by the safety confirmation condition acquisition unit.

* * * * *